(12) United States Patent
Guo

(10) Patent No.: US 7,596,794 B2
(45) Date of Patent: Sep. 29, 2009

(54) OPTICAL DISC DRIVE WITH A VIBRATION ATTENUATION MECHANISM

(75) Inventor: Bin-Hai Guo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 354 days.

(21) Appl. No.: 11/283,293

(22) Filed: Nov. 18, 2005

(65) Prior Publication Data

US 2006/0136939 A1    Jun. 22, 2006

(30) Foreign Application Priority Data

Dec. 22, 2004    (CN) .................... 2004 2 0103388

(51) Int. Cl.
    *G11B 17/04*    (2006.01)
    *G11B 33/02*    (2006.01)
(52) U.S. Cl. .................... 720/613; 720/610; 360/99.03
(58) Field of Classification Search ................ 720/610, 720/611, 613; 360/99.02, 99.03, 99.06, 99.07
    See application file for complete search history.

(56) References Cited

U.S. PATENT DOCUMENTS

| 5,259,689 | A | * | 11/1993 | Arand et al. | 403/337 |
|---|---|---|---|---|---|
| 5,732,063 | A | * | 3/1998 | Chen | 720/698 |
| 5,732,064 | A | * | 3/1998 | Huang | 720/611 |
| 5,963,533 | A | * | 10/1999 | Motoki et al. | 720/613 |
| 5,970,036 | A | * | 10/1999 | Matsugase | 720/614 |
| 7,020,884 | B2 | * | 3/2006 | Choi et al. | 720/613 |
| 7,043,740 | B2 | * | 5/2006 | Chen et al. | 720/610 |
| 7,131,127 | B2 | * | 10/2006 | Nasu | 720/613 |
| 7,140,029 | B2 | * | 11/2006 | Chiou et al. | 720/613 |
| 7,143,423 | B2 | * | 11/2006 | Arase | 720/613 |
| 7,206,261 | B2 | * | 4/2007 | Kimura et al. | 369/30.36 |
| 7,249,360 | B2 | * | 7/2007 | Zhang | 720/610 |
| 7,305,683 | B2 | * | 12/2007 | Namiki | 720/610 |
| 7,308,691 | B2 | * | 12/2007 | Tamura | 720/613 |
| 7,310,804 | B2 | * | 12/2007 | Bae | 720/616 |
| 7,367,034 | B2 | * | 4/2008 | Hara | 720/613 |
| 2002/0186640 | A1 | * | 12/2002 | Shimizu et al. | 369/75.2 |
| 2003/0117928 | A1 | * | 6/2003 | Choi et al. | 369/75.2 |
| 2003/0198177 | A1 | * | 10/2003 | Horimai et al. | 369/291 |
| 2003/0202447 | A1 | * | 10/2003 | Watanabe et al. | 369/75.2 |
| 2004/0197136 | A1 | * | 10/2004 | Emin | 403/280 |
| 2004/0250270 | A1 |   | 12/2004 | Zhang |   |
| 2005/0015787 | A1 | * | 1/2005 | Sakagami | 720/613 |
| 2005/0188389 | A1 | * | 8/2005 | Namiki | 720/610 |
| 2006/0143624 | A1 | * | 6/2006 | Guo | 720/613 |
| 2007/0006242 | A1 | * | 1/2007 | Hara | 720/613 |
| 2007/0079311 | A1 | * | 4/2007 | Kimura et al. | 720/613 |

* cited by examiner

*Primary Examiner*—Brian E Miller
(74) *Attorney, Agent, or Firm*—Frank R. Niranjan

(57) ABSTRACT

A disc drive includes a housing and a disc tray. The housing includes a supporting frame and two opposite sidewalls extending perpendicularly from two opposite sides of the supporting frame. Each sidewall forms at least one limiting mechanism. The disc tray is adapted for being slidably supported on the supporting frame. The disc tray forms a pair of guiding plates at two opposite side thereof. At least one of the guiding plates defines a raised portion, which forms a close clearance fit or an interference fit between the supporting frame and the limiting mechanism.

10 Claims, 3 Drawing Sheets

US 7,596,794 B2

OPTICAL DISC DRIVE WITH A VIBRATION ATTENUATION MECHANISM

BACKGROUND

1. Field of the Invention

This invention relates to an optical disc drive and, more particularly, to an optical disc drive with a vibration attenuation mechanism.

2. Related Art

Various media for recording data, such as compact discs (CD), video compact discs (VCDs), digital versatile discs (DVDs), Blu-ray Discs, and high definition/density digital versatile discs (HD-DVDs), are widely used. Related optical disc drives for recording and/or reproducing data are applied as well.

A general optical disc drive includes a housing and a disc tray slidably mounted therein. The disc tray moves an optical disc in so that an optical head can read data recorded on the optical disc and moves the optical disc out so that the optical disc can be taken away and/or be replaced by another optical disc. The disc tray forms a pair of guiding plates. The housing defines a pair of guiding grooves for receiving the guiding plates. The guiding grooves cooperate with the guiding plates, which guide the disc tray to move in and out of the disc drive in a first direction. However, there often exist narrow gaps between the guiding grooves and the guiding plates. The disc tray may have undesired vibration either both in the first direction and in a second direction perpendicular to the first direction during movement of a disc in and out of the disc drive. Accompanying the arrival of the disc tray at the end position, a traverse module, including a turntable, and the optical head are lifted up. The vibration may be transmitted to the traverse module, thereby decreasing the accuracy of reproduction and/or recording procedures.

A conventional optical disc drive for eliminating such vibration includes a tray and a drive housing. A locating cylinder is formed at a rear of the drive housing. A locating slot is defined at a rear end of the tray. The locating cylinder is guided and received into the locating slot so that the tray is firmly positioned in the drive housing. Thus, the probability of the vibration in the first direction being transmitted to the traverse module is reduced. However, the vibration in the second direction is still outstanding (i.e., may be transmitted).

Therefore, a disc drive that can reduce or, better, eliminate the probability of vibration being transmitted to the components in the second direction is desired.

SUMMARY

A disc drive includes a housing and a disc tray. The housing includes a supporting frame and two opposite sidewalls. The supporting frame includes two opposite sides. The two opposing sidewalls extend perpendicularly from the two opposite sides of the supporting frame. Each sidewall forms at least one limiting mechanism. The disc tray is configured for being slidably supported on the supporting frame. The disc tray includes a pair of guiding plates at two opposite sides thereof. At least one of the guiding plates defines a raised portion. The raised portion is higher than a remainder of the guiding plate. The raised portion is configured for forming one of a close clearance fit and an interference fit between the supporting frame and the limiting mechanism.

Other systems, methods, features, and advantages will be or become apparent to one with skill in the art upon examination of the following drawings and detailed description. It is intended that all such additional systems, methods, features, and advantages be included within this description, be within the scope of the present disc drive and be protected by the accompanying claims.

BRIEF DESCRIPTION OF THE DRAWINGS

Many aspects of the invention can be better understood with reference to the following drawings. The components in the drawings are not necessarily to scale, the emphasis instead being placed upon clearly illustrating the principles of the present disc drive. Moreover, in the drawings, like reference numerals designate corresponding parts throughout the several views.

DETAILED DESCRIPTION OF PREFERRED EMBODIMENTS

Figure 1:
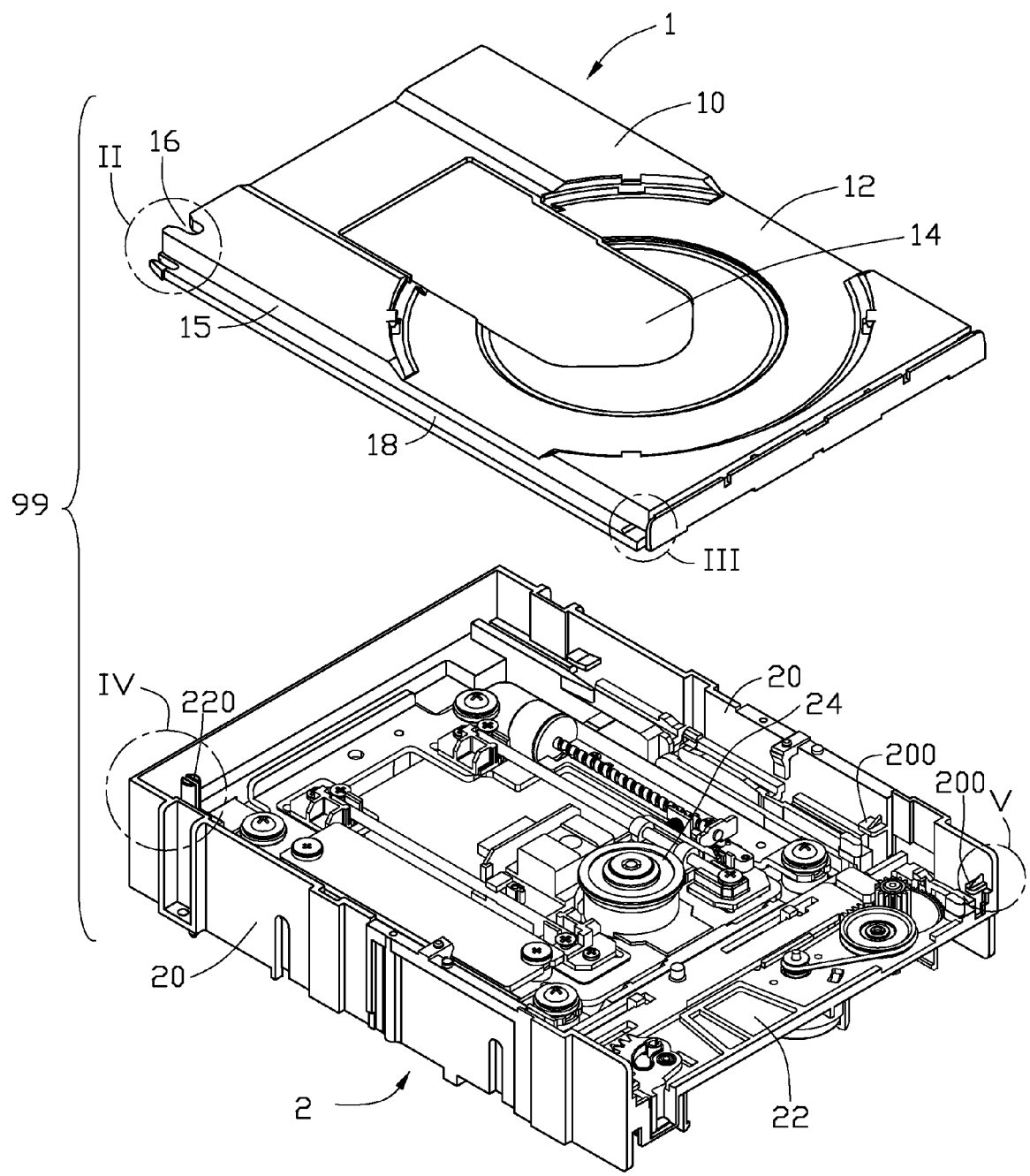
FIG. 1 is an exploded, isometric view of a disc drive in accordance with an exemplary embodiment.

Referring to FIG. 1, a disc drive 99 includes a disc tray 1 and a housing 2. The disc tray 1 is mounted in the housing 2 and configured for selectively moving back and forth relative to the housing 2. The disc tray 1 includes a top surface 10. A disc accommodating area 12 is depressed from the top surface 10. An opening 14 extends rearward from the center of the disc accommodating area 12. Two first sidewalls 15 extend perpendicularly from two opposite sides of the top surface 10. A locating slot 16 is defined at a rear corner of the disc tray 1. A pair of guiding plates 18 extends perpendicularly from the first sidewalls 15.

Figure 2:
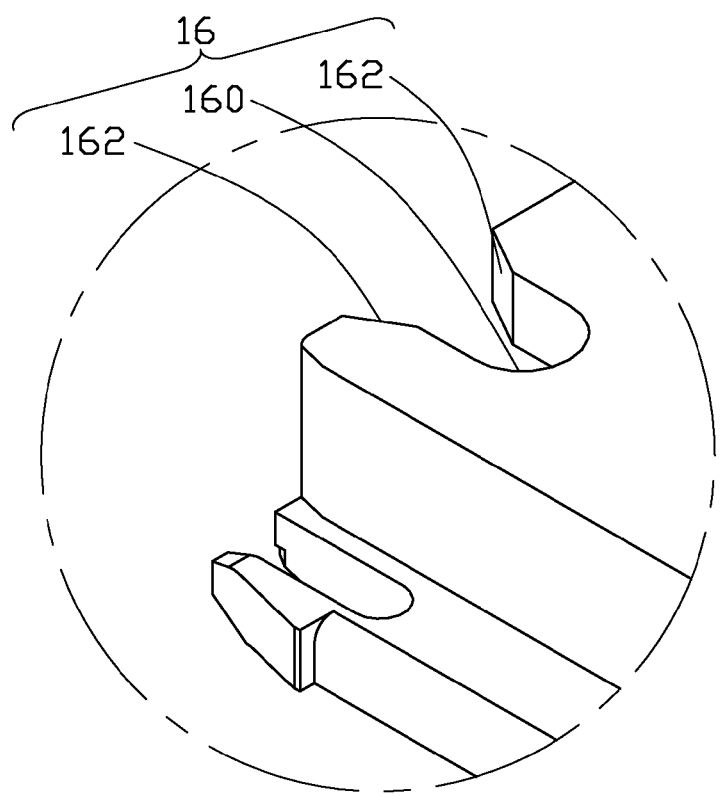
FIG. 2 is an enlarged view of a circled portion II of FIG. 1.

Referring also to FIG. 2, the locating slot 16 includes a U-Shaped receiving slot 160 and a gap 162, extending away from the receiving slot 160. The gap 162 is wider than the receiving slot 160. The gap 162 broadens from the receiving slot 160 to a rear edge of the disc tray 1.

Figure 3:
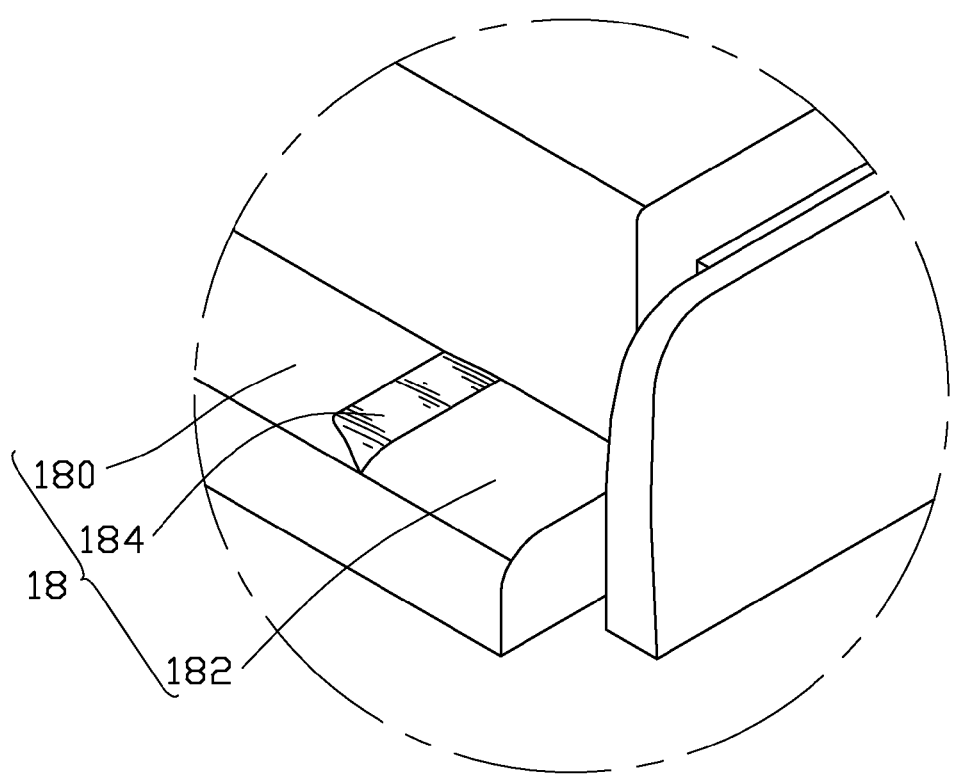
FIG. 3 is an enlarged view of a circled portion III of FIG. 1.

Referring also to FIG. 3, one of the guiding plates 18 includes a first section 180 and a second section 182. The second section 182 is located at or at least proximate the front of the guiding plates 18. The top surface of the second section 182 is higher than the top surface of the first section 180. As such, each second section 182 is a raised section/portion, relative to the remainder of a corresponding guiding plate 18. A connecting section 184 aslant interconnects the top surface of the first section 180 and the top surface of the second section 182. The connecting section 184 is substantially inclined. Together, the second section 182 and the connecting section 184 establish a convex section (not numbered) in a given guiding plate 18.

The housing 2 includes two opposite second sidewalls 20, a supporting frame 22, and a traverse module 24. The supporting frame 22 is arranged between the two opposite sidewalls 20. The supporting frame 22 is provided and configured for supporting the disc tray 1. A plurality of limiting mechanisms 200 extends perpendicularly from each second sidewall 20. The limiting mechanisms 200, cooperating with the supporting frame 22, each form a guiding space for guiding the disc tray 1 to move along the sidewalls 20. A locating post 220 is formed at a rear corner of the supporting frame 22.

Figure 4:
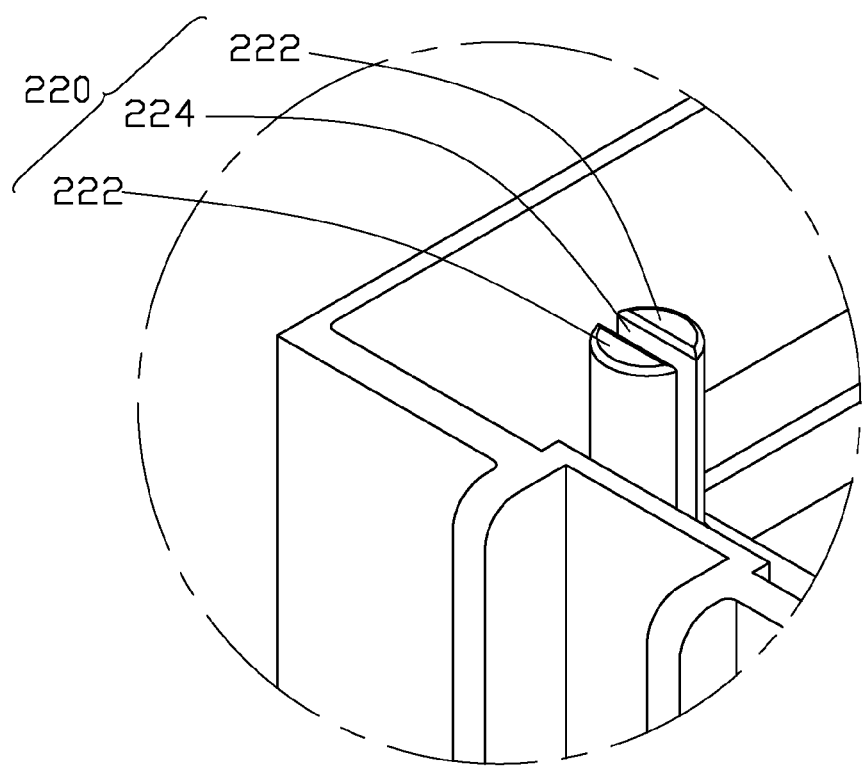
FIG. 4 is an enlarged view of a circled portion IV of FIG. 1.

Referring also to FIG. 4, the locating post 220 defines a vertical through slot 224. The vertical through slot 224 divides the locating post 220 into two elastic parts 222. When a force is applied toward the slot 224, the elastic parts 222 may deform. A diameter of the locating post 220 is a little greater than that of the receiving slot 160 but is less than that of the gap 162. As such, the gap 162 of the locating slot 16 is able to direct the locating post 220 into the receiving slot 160, upon movement of the locating post 220 into the locating slot 16. The difference in diameter between the locating post 220 and the receiving slot 160 should advantageously not be more than that which may be accommodated by the width of the vertical through slot 224.

Figure 5:
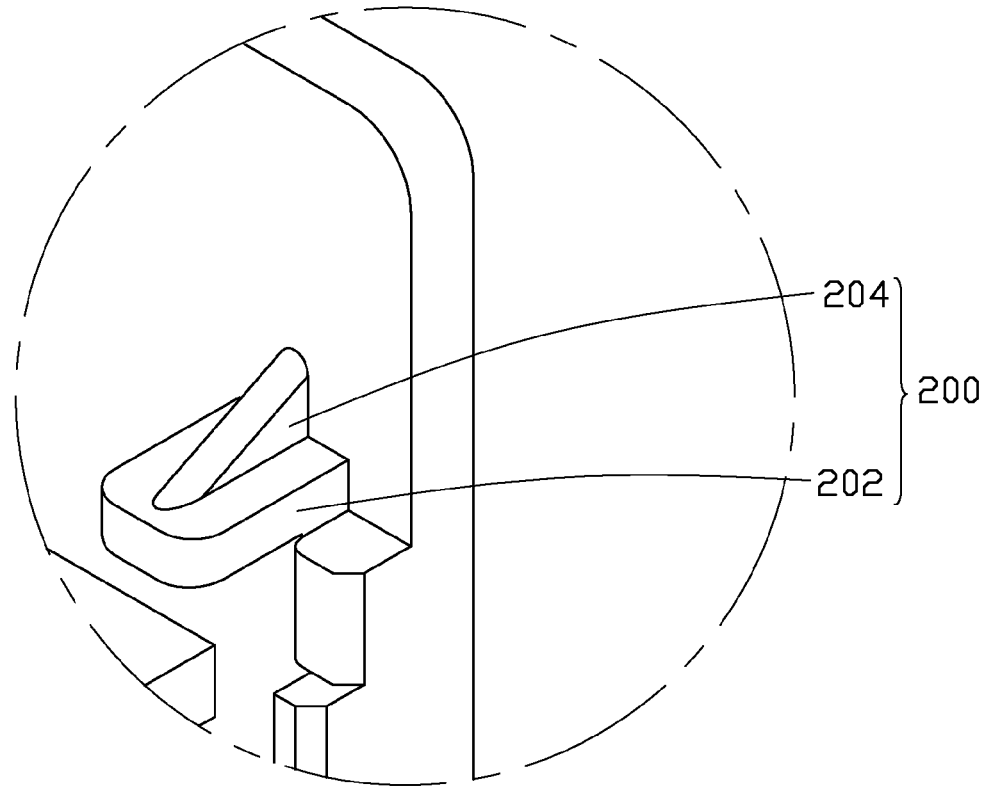
FIG. 5 is an enlarged view of a circled portion V of FIG. 1.

Referring also to FIG. 5, each limiting mechanism 200 includes a horizontal piece 202 and a rib 204. The horizontal piece 202 is parallel with the supporting frame 22. A distance between a bottom surface of the horizontal piece 202 and a top surface of the supporting frame 22 is equal to or slightly greater than a height of the second section 182. The rib 204 extends perpendicularly from the second sidewall 20 and is located on a top surface of the horizontal piece 202. The rib 204 is substantially triangular in shape and is provided for reinforcing and securing the horizontal piece 202 onto the second sidewall 20.

When the disc tray 1 moves in toward an end position, the guiding plates 18 move between the guiding space defined by the supporting frame 22 and the limiting mechanisms 200. As the disc tray 1 reaches the end position, the locating post 220 slides into the receiving slot 160 via the gap 162, thereby limiting any potential horizontal movement. At the same time, the second section 182 of the guiding plates 18 slides into the guiding space and advantageously forms an interference fit between the supporting frame 22 and the horizontal piece 202. Alternatively, the height of the second section 182 could be chosen such a close clearance fit would instead exist between the supporting frame 22 and the horizontal piece 202. The traverse module 24 is lifted up through the opening 14, and the disc tray 1 is held in the end position. Vibrations both in the horizontal and vertical directions are reduced by either the interference fit or close clearance configurations. More vertical vibrations could be expected with the close clearance configuration, but even that configuration would limit the size of the possible vibrations due to the limited gap between the second section 182 and the horizontal piece 202. The adverse effect on the operation of the traverse module 24 is thus reduced.

It should be noted that the number of limiting mechanisms 200 on each second sidewall 20 is not limited to the above-described exemplary embodiments. In addition, the limiting mechanism 200 can alternatively be a triangular block or other similar block. The number of locating post 220 could, for example, be two. In that instance, the two locating posts 220 could be located at two opposite rear corners of the housing 2. Accordingly, a pair of corresponding locating slots 16 would be defined at the rear corners of the disc tray 1. Additionally, one or both of the guiding plates 18 could include a second section 182, depending on the degree of vibration control desired.

The embodiments and methods described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A disc drive, comprising:
a housing including a supporting frame and two opposite sidewalls, the supporting frame including two opposite sides, the two opposite sidewalls extending perpendicularly from the two opposite sides of the supporting frame, each sidewall forming at least one limiting mechanism, the housing further defining a locating post extending upwardly from the supporting frame; and
a disc tray configured for being slidably supported on the supporting frame, the disc tray including a pair of guiding plates at two opposite sides thereof, at least one of the guiding plates defining a raised portion, the raised portion being higher than a remainder of the guiding plate, the raised portion being configured for forming one of a close clearance fit and an interference fit between the supporting frame and the limiting mechanism, the disk tray further defining a locating slot at a rear edge thereof, wherein the locating slot comprises a U-shaped receiving slot configured for receiving the locating post therein and an opening broadening from the receiving slot.

2. The disc drive as claimed in claim 1, wherein a height of the raised portion is at least equal to a distance from a top surface of the supporting frame to a bottom surface of the limiting mechanism.

3. The disc drive as claimed in claim 1, wherein a height of the raised portion is less than a distance from a top surface of the supporting frame to a bottom surface of the limiting mechanism.

4. The disc drive as claimed in claim 1, wherein the raised portion is located proximate an end of the guiding plate.

5. The disc drive as claimed in claim 1, wherein the limiting mechanism comprises a horizontal portion parallel to the supporting frame.

6. The disc drive as claimed in claim 5, wherein the limiting mechanism comprises a rib being disposed both on the horizontal portion and the sidewall.

7. The disc drive as claimed in claim 1, wherein the locating post comprises two elastic parts and a through slot located between the two elastic parts.

8. The disc drive as claimed in claim 1, wherein the opening broadens from the U-shaped receiving slot to the rear edge of the disk tray, and is wider than the U-shaped receiving slot.

9. The disc drive as claimed in claim 1, wherein a diameter of the locating post is a little greater than that of the U-shaped receiving slot but is less than that of the opening.

10. The disc drive as claimed in claim 9, wherein the locating post comprises two elastic parts and a through slot located between the two elastic parts.

* * * * *

UNITED STATES PATENT AND TRADEMARK OFFICE
CERTIFICATE OF CORRECTION

PATENT NO. : 7,596,794 B2  Page 1 of 1
APPLICATION NO. : 11/283293
DATED : September 29, 2009
INVENTOR(S) : Bin-Hai Guo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 669 days.

Signed and Sealed this

Twenty-eighth Day of September, 2010

David J. Kappos
*Director of the United States Patent and Trademark Office*